A. J. LEE.
COTTON-CLEANER.

No. 181,352. Patented Aug. 22, 1876.

WITNESSES:
E. Wolff.
John Goethals

INVENTOR:
Amos J. Lee
BY Munn
ATTORNEYS.

UNITED STATES PATENT OFFICE.

AMOS J. LEE, OF LINEBURG, ALABAMA.

IMPROVEMENT IN COTTON-CLEANERS.

Specification forming part of Letters Patent No. 181,352, dated August 22, 1876; application filed May 9, 1876.

*To all whom it may concern:*

Be it known that I, AMOS J. LEE, of Lineburg, Pickens county, Alabama, have invented a new and Improved Cotton-Cleaner, of which the following is a specification:

My improved cotton-cleaner consists of a kind of long trough or case, with a bottom of longitudinal slats or grates, and sides of vertical or inclined grates or slats, in which trough is a shaft having paddles arranged obliquely and in spiral rows around the shaft for beating the cotton out, and at the same time feeding it along from the end in which it is supplied to the end for discharging it, the same being a very efficient contrivance, which does not clog or twist the material; but the paddles generate a considerable amount of wind, which drives out all dust and dirt through the openings between the slats.

Figure 1:
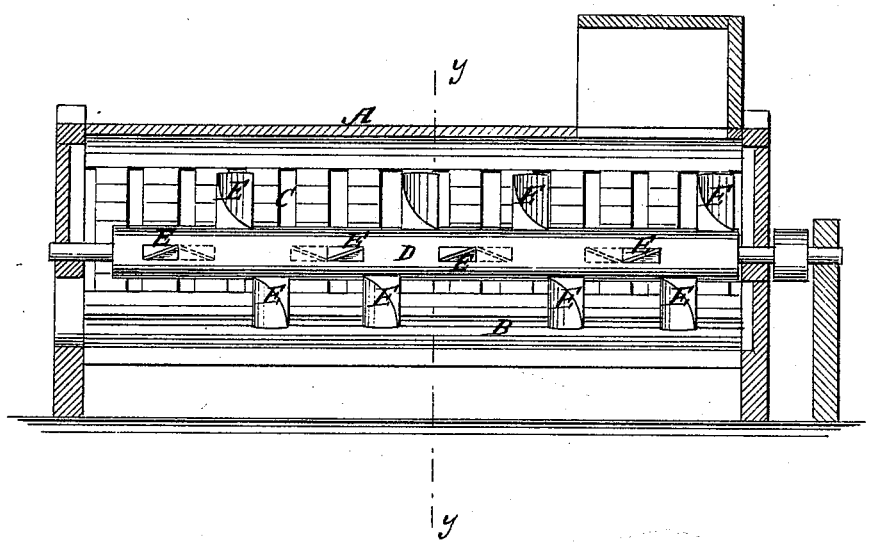
Figure 2:
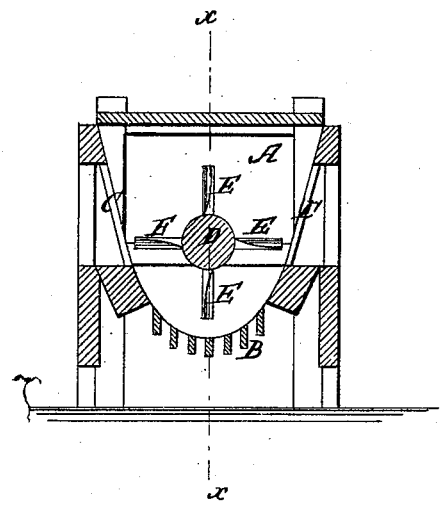

Figure 1 is a longitudinal sectional elevation of my improved cotton-cleaner, taken on line $x\,x$, Fig. 2; and Fig. 2 is a transverse section on line $y\,y$ of Fig. 1.

A represents the case of the cleaner; B, the bottom of longitudinal slats or grate-bars; C, the sides of vertical or inclined grate-bars; D, the shaft, and E the paddles for beating the cotton and driving out the dust through the grate-bars.

The paddles E are concaved in front or upon their working faces, in order to gather and force the air through the cleaner with more effect.

Having thus described my invention, I claim as new and desire to secure by Letters Patent—

The cotton-cleaner case A, having bottom slats B and side slats C, in combination with revolving shaft D, having spirally-arranged paddles E, concaved on their working faces, as shown and described.

AMOS J. LEE.

Witnesses:
A. J. PETERSON,
E. H. TALIAFERRO.